(12) United States Patent
Wu et al.

(10) Patent No.: US 9,955,185 B2
(45) Date of Patent: Apr. 24, 2018

(54) METHOD AND APPARATUS OF CONSTRAINED INTRA BLOCK COPY FOR CODING VIDEO

(71) Applicant: MediaTek Inc., Hsin-Chu (TW)

(72) Inventors: Tung-Hsing Wu, Chiayi (TW); Han-Liang Chou, Baoshan Township, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 119 days.

(21) Appl. No.: 14/883,883

(22) Filed: Oct. 15, 2015

(65) Prior Publication Data

US 2016/0241875 A1 Aug. 18, 2016

Related U.S. Application Data

(60) Provisional application No. 62/115,287, filed on Feb. 12, 2015.

(51) Int. Cl.
*H04N 19/176* (2014.01)
*H04N 19/593* (2014.01)
(Continued)

(52) U.S. Cl.
CPC ......... *H04N 19/593* (2014.11); *H04N 19/176* (2014.11); *H04N 19/423* (2014.11)

(58) Field of Classification Search
CPC ... H04N 19/176; H04N 19/103; H04N 19/105
See application file for complete search history.

(56) References Cited

U.S. PATENT DOCUMENTS 6,297,180 B1 10/2001 Maier
9,398,302 B2 7/2016 Chou et al.
(Continued)

FOREIGN PATENT DOCUMENTS

CN 104159106 A 11/2014
CN 104219531 A 12/2014
CN 104272737 A 1/2015

OTHER PUBLICATIONS

Budagavi, AHG8: Video coding using Intra motion compensation; Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013; Document: JCTVC-M0350.*
(Continued)

*Primary Examiner* — Dave Czekaj
*Assistant Examiner* — Alison Slater
(74) *Attorney, Agent, or Firm* — McClure, Qualey & Rodack, LLP

(57) ABSTRACT

A method of IntraBC (Intra-block copy) coding for a coding region is disclosed. Embodiments of the present invention derive an IntraBC (Intra picture block copy) predictor from a constrained previous reconstructed region so as to reduce storage requirement for the previous reconstructed data. In one embodiment, a maximum absolute vertical BV (block vector) value, MaxV_BV is determined, where MaxV_BV is smaller than a full vertical search range for the coding region. A constrained previous reconstructed region corresponding to previous reconstructed samples processed before the current block is then determined, where the constrained previous reconstructed region includes at least MaxV_MV reconstructed samples in vertical direction above the current block and excludes at least one row of reconstructed samples for the current block with a vertical distance larger than MaxV_MV. Each coding block may correspond to a prediction unit (PU) or a coding unit (CU).

19 Claims, 6 Drawing Sheets

(51) Int. Cl.
*H04N 19/426* (2014.01)
*H04N 19/423* (2014.01)

(56) References Cited

U.S. PATENT DOCUMENTS

| | | | |
|---|---|---|---|
| 2014/0341288 A1 | 11/2014 | Wu et al. | |
| 2016/0241868 A1* | 8/2016 | Li | H04N 19/56 |
| 2017/0134724 A1* | 5/2017 | Liu | H04N 19/105 |
| 2017/0238001 A1* | 8/2017 | Li | H04N 19/436 |
| | | | 375/240.12 |

OTHER PUBLICATIONS

Sze, V. (2014). High Efficiency Video Coding (HEVC). New York: Springer.*

Li, Description of screen content coding technology proposal by Microsoft; Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014; Document: JCTVC-Q0035_r1.*

* cited by examiner

METHOD AND APPARATUS OF CONSTRAINED INTRA BLOCK COPY FOR CODING VIDEO

CROSS REFERENCE TO RELATED APPLICATIONS

The present invention claims priority to U.S. Provisional Patent Application, Ser. No. 62/115,287, filed on Feb. 12, 2015. The U.S. Provisional Patent Application is hereby incorporated by reference in its entirety.

FIELD OF THE INVENTION

The present invention relates to video coding using Intra Block Copy (IntraBC) mode. In particular, the present invention relates to techniques to reduce the storage required for the Intra-block copy (IntraBC) coding mode in screen content coding or video coding.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In the current development of screen content coding (SCC) for the High Efficiency Video Coding (HEVC) standard, a new Intra coding mode, named Intra Block Copy (IntraBC) has been disclosed. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named block vector (BV), and residual for the current CU are coded. The HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

Since the initial IBC technique was introduced in JCTVC-M0350, variations of IBC and various improvements have been disclosed. In particular, while only the horizontal block vector is allowed in JCTVC-M0350, the current IBC uses two-dimensional block vectors. FIG. 2 illustrates an example of previous reconstructed region that can be used as reference data for encoding a current block according to IBC. In FIG. 2, the blocks in a current frame (210) are processed in a pre-defined order (e.g. horizontal scan). When the current block (220) is coded, the previous reconstructed blocks in the previous reconstructed region (230) can be used as an IntraBC predictor for the current block.

The IntraBC predictor (350) for the current block (320) is located according to the block vector (340) as shown in FIG. 3. The IntraBC predictor is treated as a reference block for the current block coded by IntraBC mode as if a reference block for an Inter-coded block. However, the reference block is located in the same picture as the current block while the reference block is in a previous reconstructed reference picture for Inter coding. The reference block is selected from the previous reconstructed region (330) of the current frame (310). The block vector points from the current block (320) to the reference block (350). In other words, the location of the reference block (350) is determined based on the location of the current block (320) offset by the block vector (340).

At the encoder side, the block vector is often determined by selecting a reference block in the previous reconstructed region that achieves an optimal performance. The performance can be in terms of BD-rate, which is widely used in video coding systems as a performance measure. After the block vector is determined, information related to the block vector is signaled in the bitstream so that information related to the block vector can be recovered at the decoder side for decoding the current block. According to the current HEVC standard, the previous reconstructed samples in the previous reconstructed region correspond to reconstructed pixels before the deblocking process.

A variation of IBC adopted by the HEVC standard restricts the previous reconstructed region to a ladder-shaped region (430) for coding a current block (420) in the current frame (410) as shown in FIG. 4, where each row of reconstructed blocks has the same or less number of reconstructed blocks than the previous row of reconstructed blocks. One of the reasons for the restriction of the previous reconstructed region as shown in FIG. 4 is for wave-front parallel process (WPP), which allows multiple rows of blocks processed in parallel. In screen content coding (SCC), the processing of the current block may rely on data from the block above the current block and the processing of the current block has to wait till a whole or partial above-block is processed. Therefore, the processing of a current block in a current row has to be delayed with respect to a corresponding block in the above row. Usually, delay corresponding to one or more blocks is used. While the WPP coding is intended for parallel encoding or decoding of multiple rows of blocks, the WPP structure is also used for non-parallel processing. Accordingly, the WPP structure and the ladder-shaped previous reconstructed region have also been used for IBC coding. As shown in FIG. 4, the consecutive previous reconstructed blocks within the ladder-shaped region in each row are not a complete row of blocks. For convenience, consecutive blocks in a row are referred as a row of blocks, which may be a partial row or a full row.

For the IBC processing, the previous reconstructed region has to be stored for coding the current block. The amount of stored reconstructed region will grow along the progress of the current block. FIG. 5 illustrates three instances of IntraBC coding of the current block. For time instances $t_1$, $t_2$ and $t_3$ ($t_1 < t_2 < t_3$), the previous reconstructed regions (514, 524 and 534) for the current blocks (512, 522 and 532) are indicated respectively. As shown in FIG. 5, the previous reconstructed region complies with the WPP structure (i.e., having a ladder-shaped region) continues to grow along the progress of coding process. For the last current block in the picture, the previous reconstructed region corresponds to whole picture less than the current block.

In hardware based coding processor, the data corresponding to the previous reconstructed region may be stored in a buffer or embedded memory so that the processor can access the data stored in the buffer. However, such buffer or embedded memory for the previous reconstructed region would increase the cost. On the other hand, the data for the previous reconstructed region could be stored in an external memory. Nevertheless, there might be significant penalty on processing speed due to external memory access. Accordingly, it is desirable to develop a method and apparatus to overcome the memory issue associated with storing the previous reconstructed region.

BRIEF SUMMARY OF THE INVENTION

A method of SCC (screen content coding) or video coding using an IntraBC mode (Intra-block copy mode) for a coding region is disclosed. Embodiments of the present invention derive an IntraBC (Intra picture block copy) predictor from a constrained previous reconstructed region so as to reduce storage requirement for the previous reconstructed data. In one embodiment, a maximum absolute vertical BV (block vector) value, MaxV_BV is determined, where MaxV_BV is smaller than a full vertical search range for the coding region. An memory is designated to store a constrained previous reconstructed region comprising previous reconstructed samples processed before the current block is then determined, where the constrained previous reconstructed region includes at least MaxV_MV sample rows in vertical direction above the current block and previously reconstructed blocks in a same block row as the current block, and the constrained previous reconstructed region excludes at least one reconstructed sample row for the current block with a vertical distance measured with respect to a top edge of the coding region larger than MaxV_MV. An IntraBC predictor is then derived from the constrained previous reconstructed region stored in the internal memory. The derived IntraBC predictor is then used for encoding or decoding of the current block. Each coding block may correspond to a prediction unit (PU) or a coding unit (CU).

In one embodiment, the IntraBC predictor is derived from a valid previous reconstructed region within the constrained previous reconstructed region stored in the memory, and the valid previous reconstructed region corresponds to the constrained previous reconstructed region overlapped with a ladder-shaped region related to wave-front parallel processing (WPP). In another embodiment, the constrained previous reconstructed region comprises N rows of previous reconstructed coding blocks above the current block, where N corresponds to a smallest integer larger than or equal to (MaxV_BV divided by the block height).

One aspect of the present invention addresses the determination of maximum absolute vertical BV value. In one embodiment, the maximum absolute vertical BV value can be determined based on Level or Profile associated with video data being coded, encoder configuration, or any combination thereof. For example, a first maximum absolute vertical BV value for a first Level can be equal to or larger than a second maximum absolute vertical BV value for a second Level, where the first Level is higher than the second Level. In another example, a first maximum absolute vertical BV value for a first Profile can be equal to or larger than a second maximum absolute vertical BV value for a second Profile, where the first Profile is higher than the second Profile. In yet another example, the encoder configuration may include at least two modes selected from a mode group comprising low-power mode, high-speed mode and high-quality mode. When the encoder configuration includes a mode group comprising low-power mode, high-speed mode and high-quality mode, a first maximum absolute vertical BV value for the high-quality mode can be larger than or equal to a second maximum absolute vertical BV value for the high-speed mode. Furthermore, the second maximum absolute vertical BV value for the high-speed mode can be larger than or equal to a third maximum absolute vertical BV value for the low-power mode.

In addition, a maximum absolute horizontal BV value, MaxH_BV can be determined, where MaxH_BV is smaller than a full horizontal search range for the coding region, and the constrained previous reconstructed region is further constrained to include at least MaxH_MV reconstructed sample columns in horizontal direction to a left side of the current block and to exclude at least one reconstructed sample column on the left side of the current block for the current block with a horizontal distance measured with respect to a left edge of the coding region larger than MaxH_MV. The maximum absolute horizontal BV value can be determined in a way similar to that for the maximum absolute vertical BV value. The horizontal distance is measured with respect to a left edge of the coding region In another invention, if the previous reconstructed samples correspond to Intra-coded video data, the previous reconstructed samples are stored. On the other hand, if the previous reconstructed samples correspond to Inter-coded video data, the previous reconstructed samples are not stored. In yet another embodiment, the encoder sets the maximum absolute horizontal/vertical BV (block vector) value according to a user input. The encoder may also set a limit for the maximum absolute horizontal/vertical BV (block vector) value.

In another embodiment, a maximum memory size of a reconstructed sample memory for storing a constrained previous reconstructed region is determined. An IntraBC predictor is derived from a valid previous reconstructed region within the constrained previous reconstructed region stored in the reconstructed sample memory. The maximum memory size may correspond to N coding blocks to store N previous reconstructed blocks. The maximum memory size may correspond to a full row of previous reconstructed blocks. Furthermore, the valid previous reconstructed region within the constrained previous reconstructed region corresponds to the constrained previous reconstructed region overlapped with a ladder-shaped previous reconstructed region related to wave-front parallel processing (WPP). In yet another embodiment, if the previous reconstructed samples correspond to Inter-coded video data, the previous reconstructed samples are not stored. If the previous reconstructed samples correspond to Intra-coded video data, the previous reconstructed samples will be stored.

DETAILED DESCRIPTION OF THE INVENTION

Figure 1:
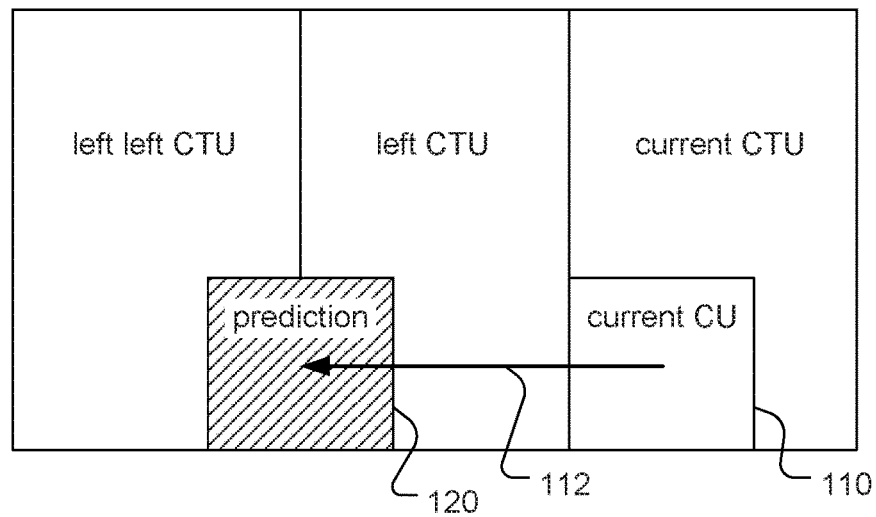
FIG. 1 illustrates an example of Intra motion compensation according to the Intra-block copy (IntraBC) mode, where a horizontal displacement vector is used to locate an IntraBC predictor in a same picture.
Figure 2:
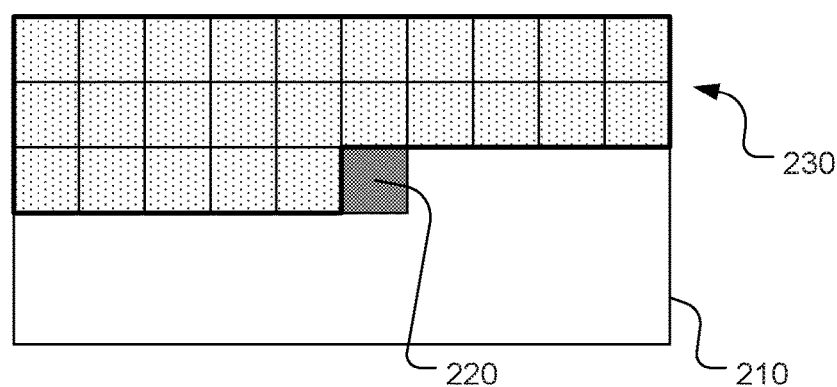
FIG. 2 illustrates an example of reconstructed neighboring block configuration used to derive block vector for IntraBC mode, where the reconstructed neighboring blocks are in a same picture as the current block.
Figure 3:
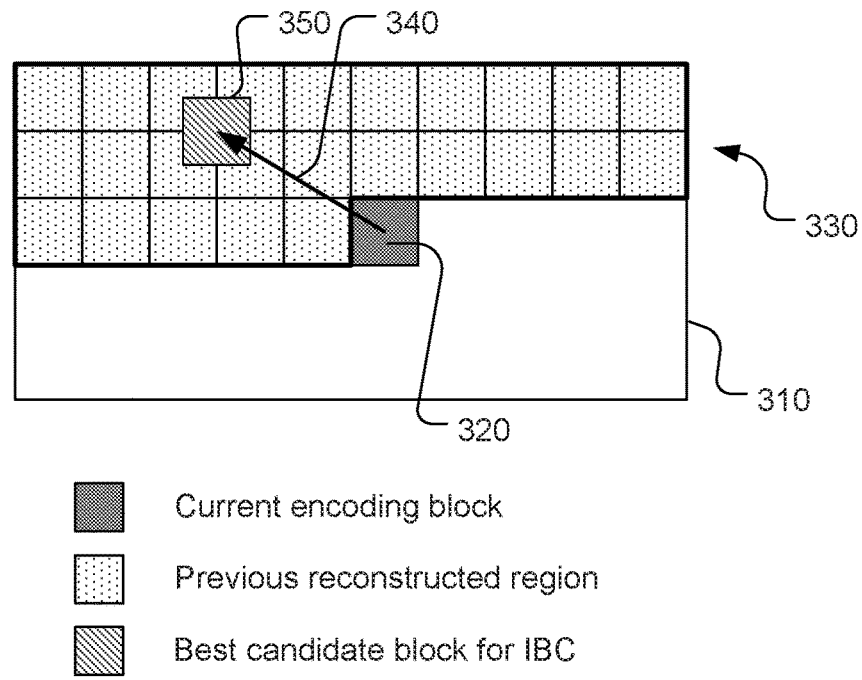
FIG. 3 illustrates an example of locating an IntraBC predictor for the current block using a block vector (BV) according to IntraBC coding, where the block vector corresponds to a two-dimensional vector.
Figure 4:
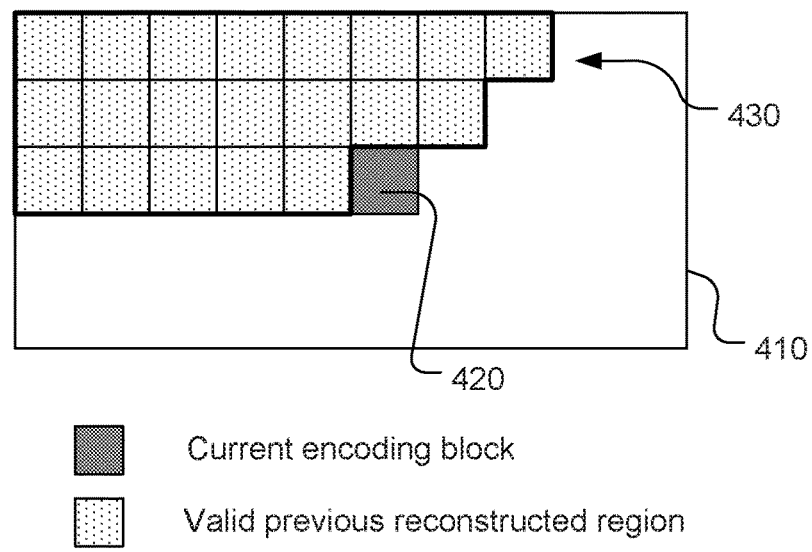
FIG. 4 illustrates an example of ladder-shaped neighboring block configuration related to wave-front parallel processing (WPP) for IntraBC mode.

According to screen content coding (SCC) in the current HEVC standard, Intra Block Copy (IntraBC) mode requires large storage space to hold data corresponding to the previous reconstructed region. This large storage requirement for storing the previous reconstructed samples would increase cost especially for hardware based solutions. Accordingly, the present invention discloses methods and apparatus to reduce the required storage associated with the previous reconstructed region for IntraBC coding.

In a first embodiment of the present invention, the maximum absolute value of the vertical block vector for IntraBC coded blocks is restricted to be less than a full search range. Furthermore, the picture can be divided into coding regions to allow multiple coding regions processed at the same time. Also, each coding region is smaller than a whole picture and may result in better performance due to local adaptation. Each coding region may correspond to a slice, a tile, a picture area or a whole picture. The image structure for the tile and the slice has been described in various coding standards such as the HEVC standard. For example, a coding region may correspond to a picture area consisting of N rows of blocks and each row consists of M blocks. When a current block at a bottom row is coded, the full vertical search range can be (N−1)× block height. In the conventional approach, the previous reconstructed samples for the whole coding region except for the last coding block have to be stored for processing the last coding block of the coding region. The first embodiment of the present invention will restrict the maximum absolute value of the vertical block vector, MaxV_MV to be smaller than the full vertical search range, i.e., (N−1)× block height in this case. For example, MaxV_MV can be smaller than the full search range by 1. In this case, the required storage for previous reconstructed samples can save one whole line of reconstructed samples.

In a preferred embodiment, MaxV_MV can be smaller than the full search range by one or more block heights of the coding blocks so that to save storage requirement corresponding to one or more rows of blocks. For example, the maximum absolute value of the vertical block vector (i.e., MaxV_MV) can be set to be $N_{VB}\times$ block height, where $N_{VB}$ is smaller than (N−1). Accordingly, the system needs only to store $N_{VB}$ rows of blocks for the previous reconstructed region above the current block and the current row up to the block before the current block. The storage requirement according to this embodiment is related to the maximum absolute value of the block vector (i.e., MaxV_MV) and the region width. Depending on the structure of the region, the region width can be the corresponding picture width, tile width, slice width CTU (coding tree unit) width or block width. This reduced vertical search range may cause some loss in the coding efficiency. However, an encoder may select a proper vertical search range to reduce the possible loss in the coding efficiency.

Figure 5:
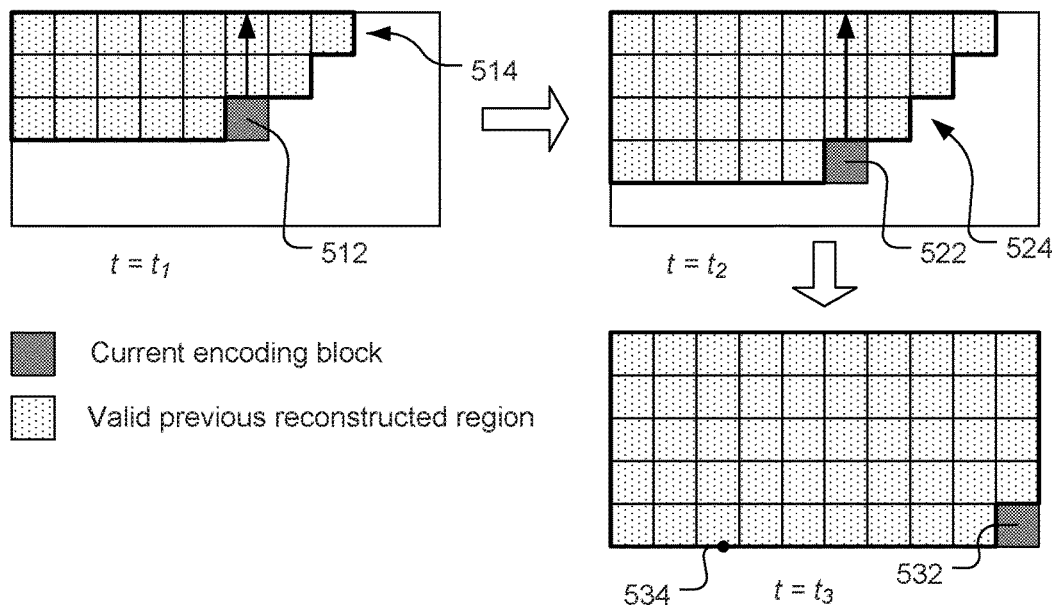
FIG. 5 illustrates an example of neighboring block storage required according to conventional IntraBC mode at three different time instances.
Figure 6:
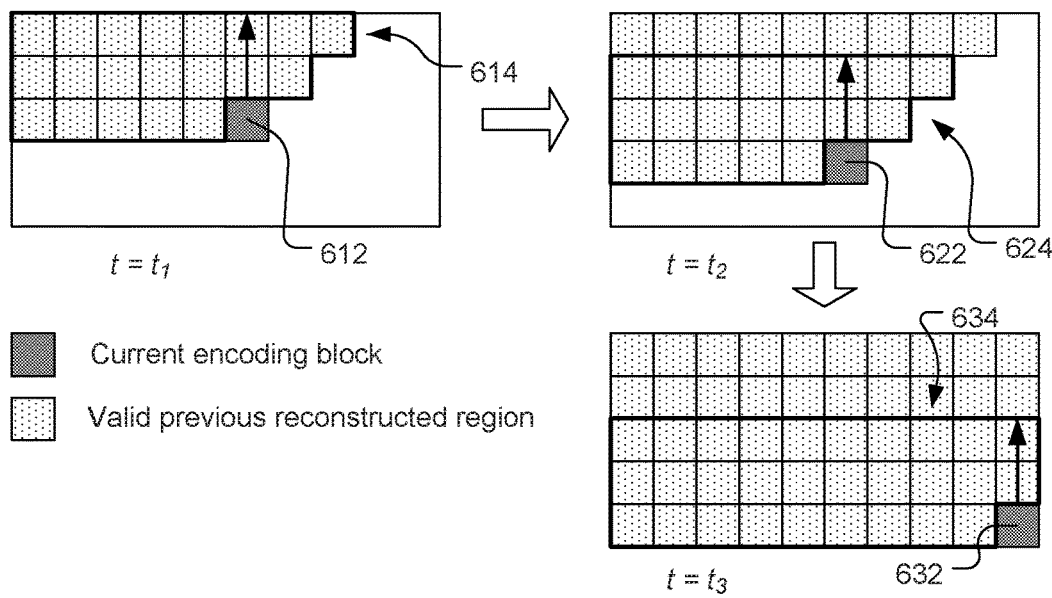
FIG. 6 illustrates an example of neighboring block storage required at three different time instances according to one embodiment of the present invention, where the maximum vertical block vector value is restricted.

FIG. 6 illustrates an example of three instances of IntraBC coding of the current block according to an embodiment of the present invention, where $N_{VB}$ is equal to 2 and the coding region consists of 5 rows of blocks. For time instances $t_1$, $t_2$ and $t_3$ ($t_1<t_2<t_3$), the previous reconstructed regions (614, 624 and 634) for the current blocks (612, 622 and 632) are indicated respectively. After $N_{VB}$ is selected, the required storage is independent of the height of the image region for IntraBC coding. Accordingly, while $N_{VB}$ rows of reconstructed blocks above the current block and the reconstructed block in the same row as the current block are stored in memory, only the valid reconstructed blocks are used to derive IntraBC predictor. As noted in FIG. 6, the constrained previous reconstructed region (612) at time instance $t_1$ is the same as the constrained previous reconstructed region (512) at time instance $t_1$ in FIG. 5. In this case, since the vertical distance for the current block is not exceeding the MaxV_MV, $N_{VB}$ rows of previous reconstructed blocks have to be stored. Therefore, there is no difference between the constrained previous reconstructed coding region and the conventional previous reconstructed coding region. However, when the vertical distance for the current block exceed the maximum absolute value of the vertical block vector (i.e., MaxV_MV), the saving in storage requirement starts to occur as evidenced by comparing between area 624 in FIG. 6 and area 524 in FIG. 5. More saving in storage requirement occurs at time instance $t_3$ as evidenced by comparing between area 634 in FIG. 6 and area 534 in FIG. 5. The vertical distance for the current block in the coding region is defined as the distance between the top boundary of the coding region and the top boundary of the current block.

In one embodiment, the IntraBC predictor is derived from a valid previous reconstructed region within the constrained previous reconstructed region stored in the memory, and the valid previous reconstructed region corresponds to the constrained previous reconstructed region overlapped with a ladder-shaped region related to wave-front parallel processing (WPP).

The selection of MaxV_MV is an encoder design issue. For example, an encoder can select MaxV_MV based on the Level or Profile of the underlying coding system. In most video standards, the Level is a set of constraints for a bitstream. A lower level often corresponds to a smaller sample rate of the input video. For example, the lowest level (i.e., Level 1) in HEVC corresponds to a maximum luma sample rate of 552,960 samples per second and the highest level (i.e., level 6.2) corresponds to a maximum luma sample rate of 4,278,190,080 samples per second. On the other hand, the Profile is associated with a set of available coding tools and the constraint on maximum allowed bitrate. For example, HEVC defines various Main profiles (e.g., Main 10, Main 12, etc.) The MaxV_MV can also be select based on encoder configurations.

When the Level is taken into account for MaxV_MV selection, a larger MaxV_MV can be selected for a higher level. In HEVC, a higher level often implies a higher spatial resolution. Therefore, in order to offer a similar effective search range, a larger MaxV_MV is selected for a higher level. Table 1 illustrates an example of MaxV_MV selection according to the Level.

TABLE 1

| Level | Max Vertical Vector, MaxV_MV (Integer pixel) |
|---|---|
| 1 | 36 |
| 2 | 72 |
| 2.1 | 90 |
| 3 | 135 |
| 3.1 | 180 |
| 4 | 180 |
| 4.1 | 180 |
| 5 | 360 |
| 5.1 | 360 |
| 5.2 | 360 |
| 6 | 540 |
| 6.1 | 540 |
| 6.2 | 540 |

The example shown in Table 1 is intended for illustration purpose. A skilled person may use different values of MaxV_MV for various Levels to practice the present invention without departing from the spirit if the present invention.

When the Profile is taken into account for MaxV_MV selection, a larger MaxV_MV can be selected for a higher Profile. Table 2 illustrates an example of MaxV_MV selection according to the Profile.

TABLE 2

| Profile | Max Vertical Vector, MaxV_MV (Integer pixel) |
|---|---|
| Main | 36 |
| Main 10 | 72 |
| Main 12 | 64 |
| Main 4:2:2 10 | 96 |
| Main 4:2:2 12 | 96 |
| Main 4:4:4 | 160 |
| Main 4:4:4 10 | 160 |
| Main 4:4:4 12 | 192 |
| Main 4:4:4 16 Intra | 255 |

The example shown in Table 2 is intended for illustration purpose. A skilled person may use different values of MaxV_MV for various profiles to practice the present invention without departing from the spirit if the present invention.

When the encoder configuration is taken into account for MaxV_MV selection, the selection may reflect the specific design concern. For example, when the encoder is configured for low power mode, it is desirable to select a smaller MaxV_MV since a smaller MaxV_MV implies a smaller vertical search range. The smaller vertical search range requires fewer searches to identify the optimal reference block. Therefore, the smaller vertical search range will lead to less power consumed, which is consistent with the intended low power mode. On the other hand, when a high power mode is used, a larger MaxV_MV can be used to take advantage of the high power available for accommodating the higher power associated with larger MaxV_MV. In another example, if a high quality mode is selected, a larger MaxV_MV than that for the high power configuration may be desired since a larger MaxV_MV may lead to better performance, i.e., higher quality.

In the second embodiment of the present invention, a maximum absolute value of the vertical block vector (MaxV_MV) and a maximum absolute value of the horizontal block vector (MaxH_MV) are selected. Similar to the first embodiment, only MaxV_MV rows of blocks for the previous reconstructed region and the current row up to the block before the current block need to be stored. However, the horizontal search range will be restricted to MaxH_MV. Furthermore, some previous reconstructed samples in some oldest previous reconstructed row of blocks may be saved.

Figure 7:
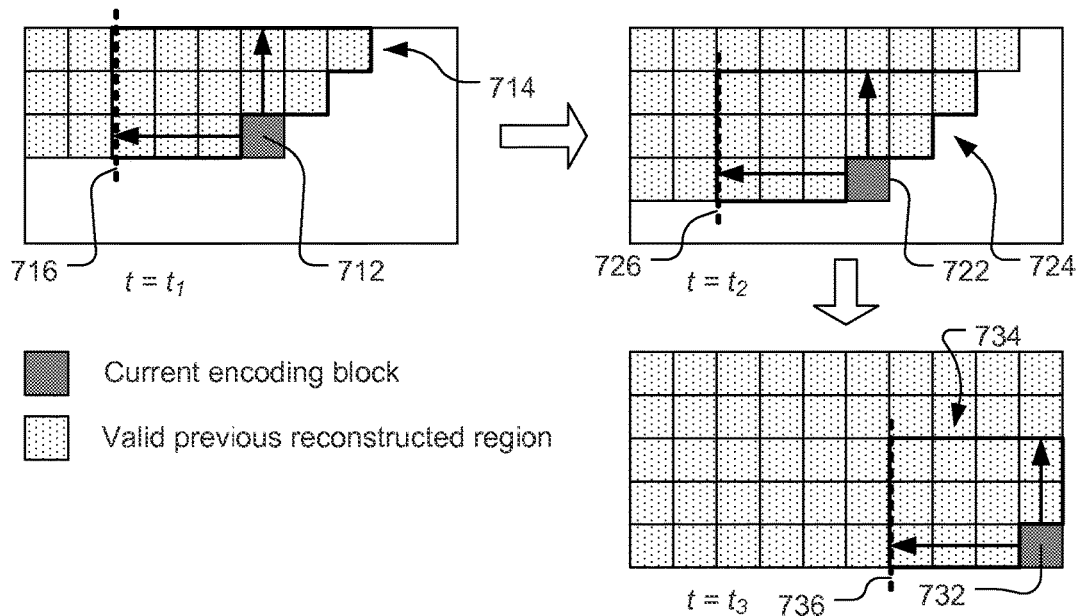
FIG. 7 illustrates an example of neighboring block storage required at three different time instances according to another embodiment of the present invention, where the maximum vertical and horizontal block vector values restricted.

FIG. 7 illustrates an example of three instances of IntraBC coding of the current block according to an embodiment of the present invention, where MaxV_MV is equal to ($N_{VB}$× block height) and $N_{VB}$ is equal to 2, MaxH_MV is equal to ($N_{HB}$× block width) and $N_{HB}$ is equal to 3 and the coding region consists of 5 rows of blocks. For time instances $t_1$, $t_2$ and $t_3$ ($t_1<t_2<t_3$), the constrained previous reconstructed regions (714, 724 and 734) for the current blocks (712, 722 and 732) are indicated respectively. After $N_{VB}$ is selected, the required storage is independent of the height of the image region for IntraBC coding. While FIG. 7 illustrates an example of required storage of previous reconstructed region according to the second embodiment, the same storage as the first embodiment can be used as well. In this case, the additional saving in storage is given up for simpler memory management.

When the maximum absolute value of the horizontal block vector (i.e., MaxH_MV) is selected, the horizontal search range will be reduced which will lead to few searches required to identify the best candidate for the reference block. In FIG. 7, the bold lines (716, 726 and 736) indicate the maximum horizontal range that the IntraBC has to search. This reduced horizontal search range may cause loss of the coding efficiency. However, an encoder may select a proper horizontal search range to reduce the possible loss of coding efficiency. Compared to FIG. 6, some additional saving in storage can be achieved. The constrained previous reconstructed region is the same as the conventional previous reconstructed region when the vertical distance of the current block in the coding region is the same or smaller than MaxV_MV and the horizontal distance of the current block in the coding region is the same or smaller than MaxH_MV. The horizontal distance for the current block in the coding region is defined as the distance between the left boundary of the coding region and the left boundary of the current block.

Similar to the first embodiment, the selection of MaxV_MV and MaxH_MV is an encoder design issue. For example, an encoder can select MaxV_MV and MaxH_MV based on the Level or Profile of the underlying coding system. Furthermore, the example of MaxV_MV selection according to the Level as shown in Table 1 and the example of MaxV_MV selection according to the Profile as shown in Table 2 can also be applied to the second embodiment. The MaxH_MV selection according to the Level and the Profile can be performed similar to the selection for MaxV_MV.

Table 3 illustrates an example of MaxH_MV selection according to the Level.

TABLE 3

| Level | Max Horizontal Vector, MaxH_MV (Integer pixel) |
|---|---|
| 1 | 44 |
| 2 | 88 |
| 2.1 | 160 |
| 3 | 240 |
| 3.1 | 320 |
| 4 | 320 |
| 4.1 | 320 |
| 5 | 512 |
| 5.1 | 512 |
| 5.2 | 512 |
| 6 | 540 |
| 6.1 | 540 |
| 6.2 | 540 |

The example shown in Table 3 is intended for illustration purpose. A skilled person may use different values of MaxH_MV for various levels to practice the present invention without departing from the spirit if the present invention.

Table 4 illustrates an example of MaxH_MV selection according to the Profile.

TABLE 4

| Profile | Max Horizontal Vector, MaxH_MV (Integer pixel) |
|---|---|
| Main | 48 |
| Main 10 | 96 |
| Main 12 | 64 |
| Main 4:2:2 10 | 128 |
| Main 4:2:2 12 | 128 |
| Main 4:4:4 | 192 |
| Main 4:4:4 10 | 192 |
| Main 4:4:4 12 | 255 |
| Main 4:4:4 16 Intra | 360 |

The example shown in Table 4 is intended for illustration purpose. A skilled person may use different values of MaxH_MV for various profiles to practice the present invention without departing from the spirit if the present invention.

When the encoder configuration is taken into account for MaxV_MV and MaxH_MV selection, the selection may reflect the specific design concern. The consideration for MaxV_MV in the first embodiment is also applicable to MaxH_MV. For example, when the encoder is configured for low power mode, it is desirable to select a smaller MaxH_MV since a smaller MaxH_MV implies a smaller vertical search range. The smaller vertical search range requires fewer searches to identify the optimal reference block. Therefore, the smaller vertical search range will lead to less power consumed, which is consistent with the intended low power mode. On the other hand, when a high power mode is used, a larger MaxH_MV can be used to take advantage of the high power available for accommodating the higher power associated with larger MaxH_MV. In another example, if a high quality mode is selected, a larger MaxH_MV than that for the high power configuration may be desired since a larger MaxH_MV may lead to better performance, i.e., higher quality.

In yet another embodiment, the encoder sets the maximum absolute horizontal/vertical BV (block vector) value according to a user input. For example, the encoder system may provide two registers MaxV_MV and MaxH_MV representing the absolute horizontal/vertical BV (block vector) values for the user to enter the desired values. The encoder may also set a limit for the maximum absolute horizontal/vertical BV (block vector) value. In this case, the encoder will only search for the block vector value up to the maximum vertical BV value in the vertical direction and up to the maximum horizontal BV value in the horizontal direction.

Figure 8:
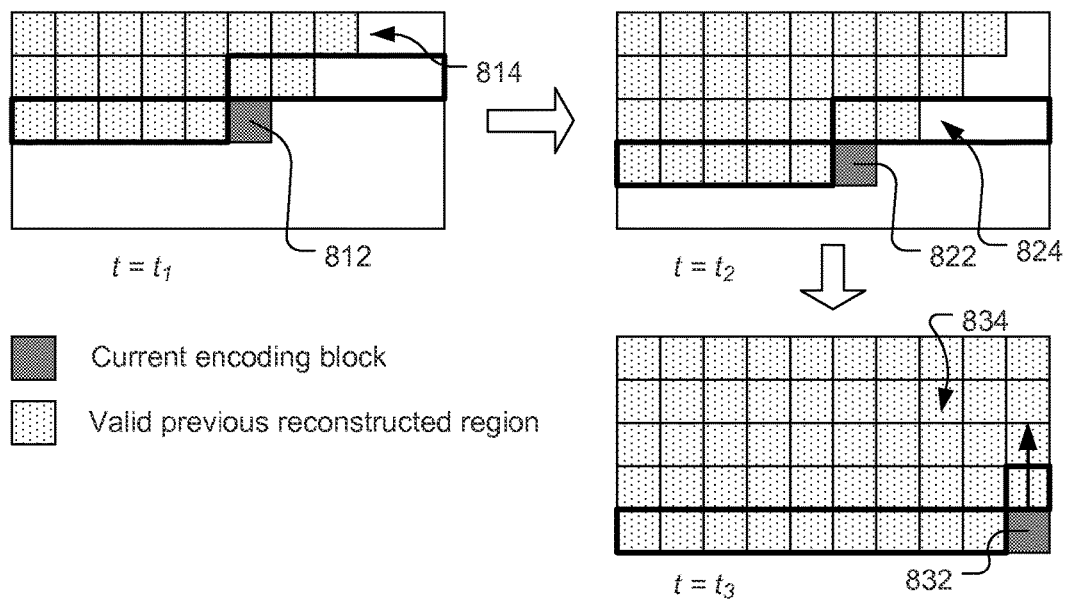
FIG. 8 illustrates an example of neighboring block storage required at three different time instances according to yet another embodiment of the present invention, where a maximum memory size for storing previous reconstructed samples is specified.

In the third embodiment, a maximum size of the memory storing the previous reconstructed pixels is selected. The maximum size of the memory storing the previous reconstructed pixels will intrinsically restrict the maximum absolute value of the vertical block vector and/or the maximum absolute value of the horizontal block vector. For example, a coding region consists of N rows of blocks and each row consists of M blocks. The maximum size of the memory storing the previous reconstructed pixels is set to M as shown in FIG. 8 for three time instances. For instances $t_1$, $t_2$ and $t_3$ ($t_1 < t_2 < t_3$), the previous reconstructed regions (814, 824 and 834) for the current blocks (812, 822 and 832) are indicated respectively. Furthermore, the regions of blocks (816, 826 and 836) stored in the memory are indicated in FIG. 8. Since the memory only holds one full row worth of blocks, the maximum value of the vertical block vector is no more than one block height. The maximum value of the horizontal block vector depends on the location of the current block. According to the example in FIG. 8, the maximum value of the horizontal block vector pointing to the left direction is ((M−1)× block width), which occurs for the last block of the region. The maximum value of the horizontal block vector pointing to the right direction is 1 block width in the example of FIG. 8.

Figure 9:
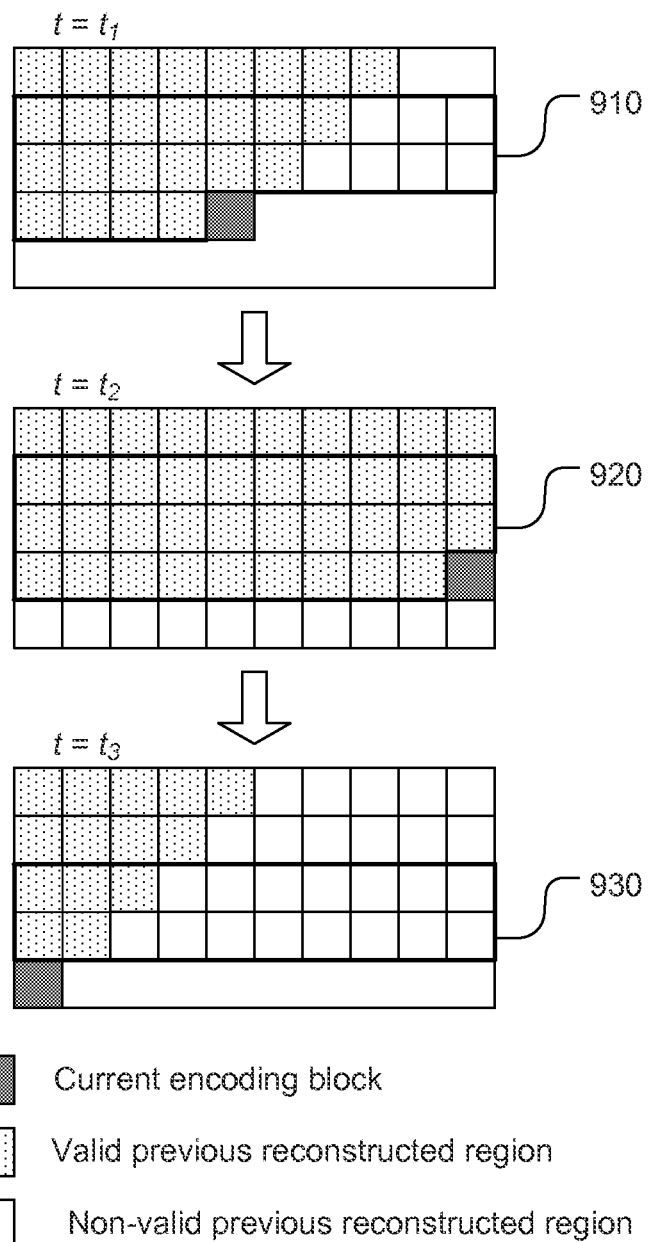
FIG. 9 illustrates an example of neighboring block storage required at three different time instances according to yet another embodiment of the present invention, where not all valid previous reconstructed samples stored in the memory will be used as reference samples.

FIG. 9 illustrates an example of neighboring block storage required at three different time instances according to yet another embodiment of the present invention, where not all valid previous reconstructed samples stored in the memory will be used as reference samples. The example illustrates a case where a memory is used to store up to three block rows of reconstructed samples to support vertical prediction distance up to two block height. At time instance one (i.e., $t=t_1$), the stored reconstructed samples are indicated by a thick-lined area (910). While the memory stores reconstructed samples through the end of the two above rows, the encoder only consider some of the reconstructed samples in the memory as "valid samples". For example, to comply with the WPP coding structure, only the dot-filled blocks are valid reconstructed samples as indicated by thick-lined area (910) shown in FIG. 9. At time instance one (i.e., $t=t_2$), the entire stored reconstructed samples are considered valid samples as indicated by thick-lined area (920) shown in FIG. 9. At time instance one (i.e., $t=t_3$), only a few blocks are considered valid samples as indicated by thick-lined area (930) shown in FIG. 9.

In the existing HEVC standard, a constrained Intra prediction mode as indicated by a flag can be used for an Intra coded block. In the constrained Intra prediction mode, only previous reconstructed pixels corresponding to Intra coded data can be used as prediction data for the current block coded using the Intra mode. If the previous reconstructed pixels corresponding to Inter coded data, the prediction data will be viewed as unavailable for the current block coded in the Intra mode. The IntraBC mode is also in Intra mode category. Accordingly, in the fourth embodiment, constrained Intra prediction is applied to an IntraBC coded block. Only previous reconstructed pixels corresponding to Intra coded data will be used as prediction data for the current block coded using the IntraBC mode. If the previous reconstructed pixels corresponding to Inter coded data, the prediction data will be viewed as unavailable for the current block coded in the IntraBC mode.

Figure 10:
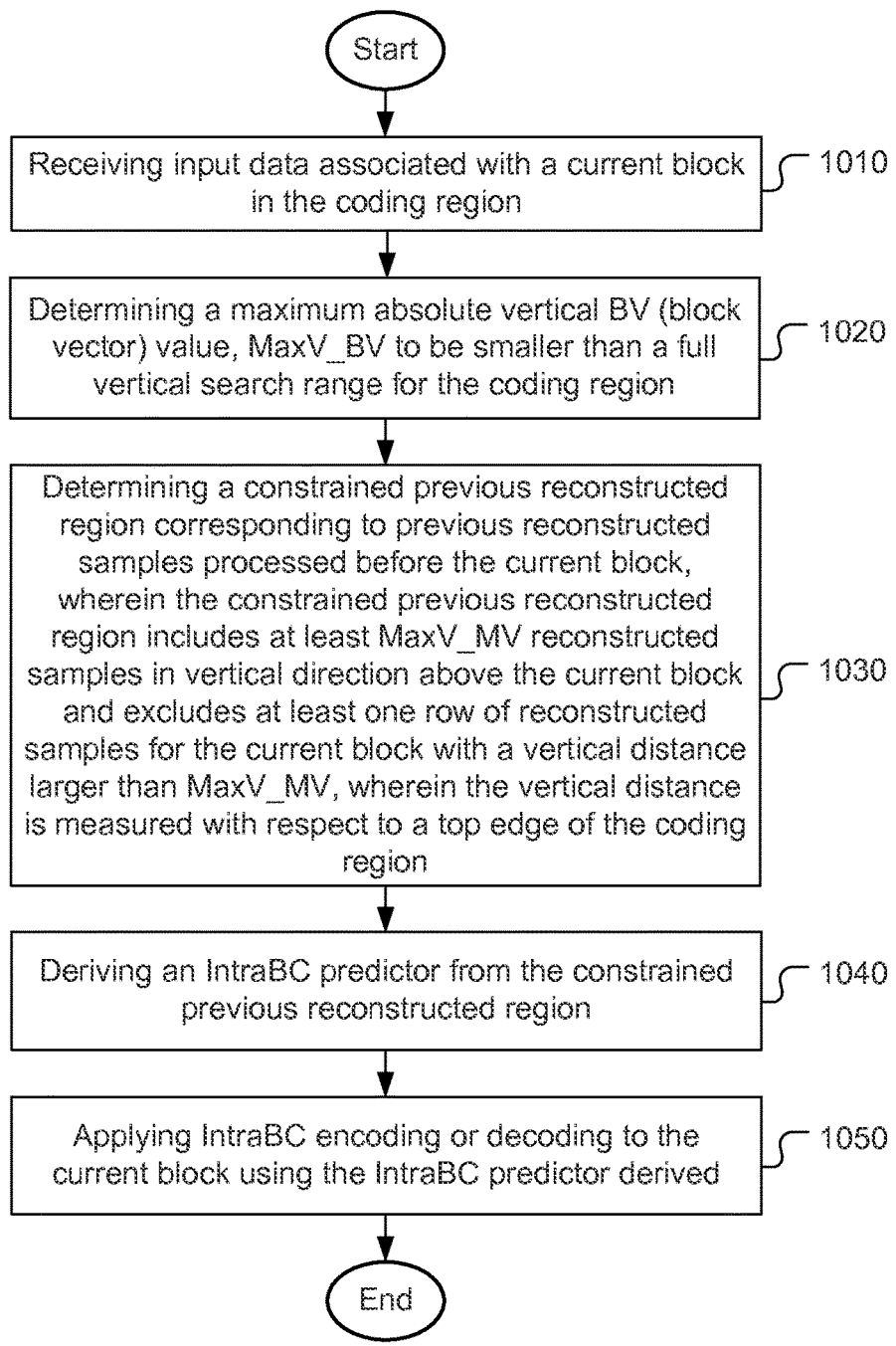
FIG. 10 illustrates an exemplary flowchart for an IntraBC coding system incorporating an embodiment of the present invention to reduce storage requirement by using a constrained previous reconstructed region.

FIG. 10 illustrates an exemplary flowchart for an IntraBC coding system incorporating an embodiment of the present invention to reduce storage requirement by using a constrained previous reconstructed region. The system receives input data associated with a current block in the coding region as shown in step 1010. For encoding, the input data corresponds to pixel data to be encoded. For decoding, the input data corresponds to coded pixel data to be decoded. The input data may be retrieved from memory (e.g., computer memory, buffer (RAM or DRAM) or other media) or from a processor. A maximum absolute vertical BV (block vector) value, MaxV_BV is determined in step 1020, where MaxV_BV is smaller than a full vertical search range for the coding region. A constrained previous reconstructed region corresponding to previous reconstructed samples processed before the current block is determined in step 1030, where the constrained previous reconstructed region includes at least MaxV_MV reconstructed samples in vertical direction above the current block and excludes at least one row of reconstructed samples for the current block with a vertical distance larger than MaxV_MV, wherein the vertical distance is measured with respect to a top edge of the coding region. An IntraBC predictor is derived from the constrained previous reconstructed region in step 1040. IntraBC encoding or decoding is applied to the current block using the IntraBC predictor derived in step 1050.

The flowchart shown above is intended to illustrate examples of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of screen content coding (SCC) or video coding using an intra-block copy mode (IntraBC mode) for a coding region with a coding region height and a coding region width, wherein the coding region is divided into multiple coding blocks each with a block height and a block width, the method comprising:
receiving input data associated with a current block in the coding region;
determining a maximum absolute vertical block vector (BV) value (MaxV_BV), wherein the MaxV_BV is smaller than a full vertical search range for the coding region;
designating a memory to store a constrained previous reconstructed region comprising previous reconstructed samples processed before the current block, wherein the constrained previous reconstructed region includes at least Maximum Vertical Vector (MaxV_MV) sample rows in vertical direction above the current block and previously reconstructed blocks in a same block row as the current block, and the constrained previous reconstructed region excludes at least one reconstructed sample row for the current block with a vertical distance measured with respect to a top edge of the coding region larger than MaxV_MV;
deriving an IntraBC predictor from the constrained previous reconstructed region stored in the memory; and
applying IntraBC encoding or decoding to the current block using the IntraBC predictor derived, wherein the IntraBC predictor is derived from a valid previous reconstructed region within the constrained previous reconstructed region stored in the memory, and the valid previous reconstructed region corresponds to the constrained previous reconstructed region overlapped with a ladder-shaped region related to wave-front parallel processing (WPP).

2. The method of claim 1, wherein each coding block corresponds to a prediction unit (PU) or a coding unit (CU).

3. The method of claim 1, wherein the constrained previous reconstructed region comprises N rows of previous reconstructed coding blocks above the current block, wherein N corresponds to a smallest integer larger than or equal to (MaxV_BV divided by the block height).

4. The method of claim 1, wherein the MaxV_BV is determined based on a level or profile associated with video data being coded, encoder configuration, or any combination thereof.

5. The method of claim 4, wherein a first MaxV_BV for a first level is equal to or larger than a second MaxV_BV for a second level, wherein the first level is higher than the second level.

6. The method of claim 4, wherein a first MaxV_BV for a first profile is equal to or larger than a second MaxV_BV for a second profile, wherein the first profile is higher than the second profile.

7. The method of claim 4, wherein the encoder configuration includes at least two modes selected from a mode group comprising low-power mode, high-speed mode and high-quality mode.

8. The method of claim 7, wherein the encoder configuration includes a mode group comprising low-power mode, high-speed mode and high-quality mode, and wherein a first MaxV_BV for the high-quality mode is larger than or equal to a second MaxV_BV for the high-speed mode, and the second MaxV_BV for the high-speed mode is larger than or equal to a third MaxV_BV for the low-power mode.

9. The method of claim 1, further comprising determining a maximum absolute horizontal block vector (BV) value (MaxH_BV), wherein the MaxH_BV is smaller than a full horizontal search range for the coding region, and the constrained previous reconstructed region is further constrained to include at least Maximum Horizontal Vector (MaxH_MV) reconstructed sample columns in horizontal direction to a left side of the current block and to exclude at least one reconstructed sample column on the left side of the current block for the current block with a horizontal distance measured with respect to a left edge of the coding region larger than MaxH_MV.

10. The method of claim 9, wherein the MaxH_MV is determined based on a level or profile associated with video data being coded, encoder configuration, or any combination thereof.

11. The method of claim 10, wherein a first MaxH_MV for a first level is equal to or larger than a second MaxH_MV for a second level, wherein the first level is higher than the second level.

12. The method of claim 10, wherein a first maximum absolute horizontal BV value for a first Profile is equal to or larger than a second maximum absolute vertical BV value for a second Profile, wherein the first Profile is higher than the second Profile.

13. The method of claim 10, wherein the encoder configuration includes at least two modes selected from a mode group comprising low-power mode, high-speed mode and high-quality mode.

14. The method of claim 13, wherein the encoder configuration includes a mode group comprising low-power mode, high-speed mode and high-quality mode, and wherein a MaxV_BV for the high-quality mode is larger than or equal to a second MaxV_BV for the high-speed mode, and the second MaxV_BV for the high-speed mode is larger than or equal to a third MaxV_BV for the low-power mode.

15. The method of claim 1, wherein if the previous reconstructed samples correspond to inter-coded video data, the previous reconstructed samples are not stored.

16. The method of claim 1, wherein if the previous reconstructed samples correspond to intra-coded video data, the previous reconstructed samples are stored.

17. The method of claim 1, wherein an encoder sets the MaxV_BV according to a user input.

18. The method of claim 1, wherein an encoder sets a limit for the MaxV_BV.

19. An apparatus of screen content coding (SCC) or video coding using an intra-block copy mode (IntraBC mode) for a coding region with a coding region height and a coding region width, wherein the coding region is divided into multiple coding blocks each with a block height and a block width, the apparatus comprising one or more electronic circuits configured to:
receive input data associated with a current block in the coding region;
determine a maximum absolute vertical block vector (BV) value (MaxV_BV), wherein the MaxV_BV is smaller than a full vertical search range for the coding region;
determine a constrained previous reconstructed region corresponding to previous reconstructed samples processed before the current block, wherein the constrained previous reconstructed region includes at least Maximum Vertical Vector (MaxV_MV) reconstructed samples in vertical direction above the current block and excludes at least one row of reconstructed samples for the current block with a vertical distance larger than MaxV_MV, wherein the vertical distance is measured with respect to a top edge of the coding region;
derive an IntraBC predictor from the constrained previous reconstructed region; and
apply IntraBC encoding or decoding to the current block using the IntraBC predictor derived, wherein the IntraBC predictor is derived from a valid previous reconstructed region within the constrained previous reconstructed region stored in a memory, and the valid previous reconstructed region corresponds to the constrained previous reconstructed region overlapped with a ladder-shaped region related to wave-front parallel processing (WPP).

* * * * *